(12) United States Patent
Blumenthal et al.

(10) Patent No.: US 8,751,170 B2
(45) Date of Patent: Jun. 10, 2014

(54) METHOD FOR DETERMINING THE FATIGUE OF A PUMP ROTOR OF A GAS TURBOPUMP

(75) Inventors: Roland Blumenthal, Erftstadt (DE); Michael Froitzheim, Dormagen (DE); Thomas Palten, Köln (DE); Dieter Bohry, Köln (DE); Manfred Kiefer, Wesseling (DE)

(73) Assignee: Oerlikon Leybold Vacuum GmbH, Cologne (DE)

( * ) Notice: Subject to any disclaimer, the term of this patent is extended or adjusted under 35 U.S.C. 154(b) by 1095 days.

(21) Appl. No.: 12/528,210

(22) PCT Filed: Jan. 16, 2008

(86) PCT No.: PCT/EP2008/050452
§ 371 (c)(1),
(2), (4) Date: Nov. 9, 2010

(87) PCT Pub. No.: WO2008/101752
PCT Pub. Date: Aug. 28, 2008

(65) Prior Publication Data
US 2011/0046897 A1  Feb. 24, 2011

(30) Foreign Application Priority Data

Feb. 24, 2007  (DE) .................. 10 2007 009 085

(51) Int. Cl.
*G01M 5/00* (2006.01)
*F04B 23/00* (2006.01)
*G06F 17/40* (2006.01)
*G06F 19/00* (2011.01)

(52) U.S. Cl.
CPC ................ *G01M 5/00* (2013.01); *F04B 23/00* (2013.01); *G06F 17/40* (2013.01); *G06F 19/00* (2013.01)

USPC .............. 702/34; 73/66; 73/865.8; 73/865.9; 340/679; 702/187; 702/189; 708/200

(58) Field of Classification Search
CPC ......... F04B 19/00; F04B 23/00; F04B 27/00; F04B 27/001; F23R 2900/00; F23R 2900/00005; G01L 5/00; G01M 5/00; G01M 5/0033; G01M 99/00; G06F 11/00; G06F 11/30; G06F 11/32; G06F 17/00; G06F 17/40; G06F 19/00

USPC ............ 73/66, 432.1, 457, 460, 865.8, 865.9; 340/500, 540, 665, 670, 671, 679; 702/1, 33, 34, 35, 127, 182, 183, 187, 702/189; 708/100, 105, 200

IPC .......... F04B 19/00, 23/00, 27/00, 27/001; F23R 2900/00, 2900/00005; G01L 5/00; G01M 5/00, G01M 5/0033, 99/00; G06F 11/00, 11/30, G06F 11/32, 17/00, 17/40, 19/00

See application file for complete search history.

(56) References Cited

U.S. PATENT DOCUMENTS

| | | | |
|---|---|---|---|
| 3,362,217 A * | 1/1968 | Rush et al. | 73/112.01 |
| 4,112,747 A | 9/1978 | Aldridge et al. | |
| 5,563,351 A | 10/1996 | Miller | |
| 7,181,959 B2 * | 2/2007 | Matsumoto et al. | 73/114.01 |
| 2005/0274112 A1 * | 12/2005 | Matsumoto et al. | 60/602 |

FOREIGN PATENT DOCUMENTS

| | | |
|---|---|---|
| DE | 2729467 A1 | 1/1978 |
| DE | 19512153 A1 | 10/1995 |
| DE | 10151682 A1 | 4/2003 |
| DE | 10157143 A1 | 5/2003 |
| DE | 10334817 A1 | 3/2005 |
| DE | 102004028643 B3 | 9/2005 |
| EP | 1522731 A2 | 4/2005 |
| EP | 1607585 A1 | 5/2005 |
| WO | 0070562 A1 | 11/2000 |
| WO | 02071079 A2 | 9/2002 |

* cited by examiner

*Primary Examiner* — Edward Cosimano
(74) *Attorney, Agent, or Firm* — Fay Sharpe LLP (57) ABSTRACT

A method for determining the fatigue of the pump rotor of a gas turbopump comprises the following method steps:

continuous determination of the rotational speed (n) of the pump rotor,     determination of the local rotational speed maxima and minima of a temporal rotational speed profile under consideration, association of the rotational speed maxima and minima with each other to form pairs,     determination of a pair fatigue value (L) for each of the rotational speed pairs, and     accumulation of all pair fatigue values (L) to form a total fatigue value ($L_{tot}$).

In this manner it is possible to determine the cyclic stress for the pump rotor of a vacuum pump and to include it in the calculation of a total fatigue value.

15 Claims, 5 Drawing Sheets

METHOD FOR DETERMINING THE FATIGUE OF A PUMP ROTOR OF A GAS TURBOPUMP

BACKGROUND

The invention relates to a method for determining the fatigue of a pump rotor of a fast rotating gas turbopump.

Gas turbopumps and especially turbo molecular pumps are operated at rather high rotational speeds of 10,000-100,000 rpm. Because of the great centrifugal forces, temperature influences etc., the pump rotor is subject to me-chanical fatigue. In particular with gas turbopumps, narrow gaps are provided between the pump rotor and the pump stator so as to obtain as high a capacity as possible. After a certain time, the pump rotor fatigue causes a failure of the pump rotor or a collision of the pump stator and the pump rotor. In order to avoid this, the pump rotor is replaced prior to the estimated time of collision.

A chronologically constant maintenance interval may be provided that schedules maintenance work or a replacement of the pump rotor after a certain time or a certain operation period.

From DE 101 51 682 A1, a method is known wherein a dynamic maintenance interval is calculated from the absolute rotational speed and the temperature of the pump rotor. The so-called creep stress of the pump rotor is thus determined and is included in the calculation of the dynamic maintenance interval. Studies have shown that, in this manner alone, a practice-oriented dynamic maintenance interval cannot be determined with sufficient accuracy, given certain operational conditions.

SUMMARY

It is thus an object of the present invention to provide a method for determining the fatigue of the pump rotor that determines the fatigue of the pump rofor as close to reality as possible for all operational conditions actually occurring.

In accordance with the method of the invention for determining the fatigue of the pump rotor of a gas turbopump, the following method steps are provided:
- continuous determination of the rotational speed (n) of the pump rotor,
- determination of the local rotational speed maxima and minima of a temporal rotational speed profile under consideration,
- association of the rotational speed maxima and minima with each other to form pairs,
- determination of a pair fatigue value (L) for each of the rotational speed pairs, and
- accumulation of all pair fatigue values (L) to form a total fatigue value ($L_{tot}$).

Tests have shown that, besides a possible creep stress, the so-called cyclic stress is independently incorporated to a substantial degree in the life time or the fatigue of a fast-rotating metal component. Only if the cyclic stress is also detected, can, in particular, the risk of ruptures at the pump rotor be realistically included in the determination of the mechanical fatigue of the pump rotor.

Cyclic stress already occurs at stress levels clearly below the so-called tensional strength $R_m$ of a metal material and often also occurs below the yield point $R_e$ that indicates the beginning of macroscopic plastic deformation. The reason for cyclic stress is in the interaction of the microstructure of the respective material with the cyclic load stress. Microscopic microplastic deformations can occur in the material even below the yield point. These may occur, on the one hand, at sites of local load concentration in the component, but they may also occur, on the other hand, in regions of softer structure, such as in a precipitation-hardened material. However, microscopic deformations can also occur in the region of individual crystallites that show a favorable crystallographic orientation with respect to the stress direction, so that a slip and thus a plastic deformation may occur there. If these slips protrude from the component surface, microscopic steps are formed that are also referred to as intrusions and extrusions. These form notches that may cause a local stress overload. At this location, a superficial fissure may occur in the course of further cyclic stress, which is enlarged by the cyclic stress until the component is weakened at this location to such a degree that a component rupture occurs.

A detection and estimation of the cyclic stress requires the monitoring of the rotational speed of the pump rotor and the detection of the end or the termination of a cycle of rotational speed. In the present context, a cycle of rotational speed means a time interval at the beginning and the end of which the sign of the pump rotor acceleration has changed, i.e. the temporal profile of the pump rotor acceleration thus shows a zero crossing. A cycle of rotational speed preferably lasts from one zero crossing of the temporal acceleration profile to the next zero crossing. Alternatively, a cycle of rotational speed may be conceived as a time interval that starts with the beginning of a positive acceleration and ends with the end of a sequential negative acceleration.

To be able to determine the so-called cyclic stress of the pump rotor, the rotational speed (n) of the pump rotor is continuously determined. Thus, a temporal profile of the rotational speed is established for which the respective local rotational speed maxima an rotational speed minima are determined. A rotational speed maximum or minimum, respectively, is an extreme value after which, when it is reached, the sign of the acceleration changes. After a rotational speed maximum has been reached, the rotational speed thus decreases, while the rotational speed increases after a rotational speed minimum has been reached. The period under consideration may refer to a single cycle that may last from a maximum to a minimum or from a minimum to a maximum, may last from the start-up to the stop of the pump rotor, may refer to a fixed time span or to a defined number of maxima and minima.

For the period of the rotational speed profile under consideration, the rotational speed maxima and minima are each associated with each other to form pairs. Various rules or algorithms may be used to associate the rotational speed maxima and minima with each other for the generation of maximum/minimum pairs.

A pair fatigue value L is calculated from each rotational speed maximum/minimum pair. Finally, all calculated pair fatigue values L are accumulated to form a total fatigue value $L_{tot}$.

For a complex rotational speed profile, first, all rotational speed pairs are determined according to a defined rule, a fatigue value is calculated for each rotational speed pair and the fatigue values calculated are accumulated to form a total fatigue value. The total fatigue value thus indicates the total fatigue due to the cyclic stress of the pump rotor in the period under consideration. In this manner, it becomes possible to calculate a maintenance interval that includes the cyclic stress of the pump rotor in the calculation. Thus, a maintenance interval can be determined with high security and significantly higher accuracy, so that both fatigue-related damages and large safety margins for the determination of the maintenance interval can be avoided.

Preferably, a characteristic mechanic load of a respective rotational speed pair is included in the determination of the wear value L. The characteristic load of the rotational speed pair may be the arithmetic mean value of both mechanical loads, for instance, which occur due to the centrifugal forces in the relevant component at the two rotational speeds of the rotational speed maximum/minimum pair. Thus, the level of the rotational speed and the swing of the rotational speed are included in the calculation of the wear value.

Preferably, the rotational speed of the rotor is determined in constant time intervals. Therefore, in the present case, a continuous determination of the rotational speed of the rotor also means a determination at constant discrete time intervals. A time interval may last one or more seconds. Generally, this is sufficient since the rotational speed of gas Turbopumps, for instance, is not varied all the time and, in particular, can not be varied very quickly. The introduction of an appropriate time interval for the determination of the rotational speed of the rotor reduces the workload on the computer hardware 20 charged with the determination.

In a preferred embodiment of the invention, pair fatigue value is determined using an at least square, particularly preferred a cubic polynomial. Thus, a fatigue value close to reality can be calculated that indicates the stress occurred with sufficient accuracy. As an alternative, the pair fatigue value can also be determined in a simpler manner if a certain higher inaccuracy is accepted.

Preferably a fatigue signal is output as soon as the total fatigue value exceeds a threshold value for the total fatigue value. The threshold value for the total fatigue value may be chosen, for instance, such that a reserve still remains until the end of the maintenance interval so that the maintenance an be prepared several days or weeks in advance. Of course, a plurality of threshold values for the total fatigue value may be provided which cause different alarms towards the end of a maintenance interval.

BRIEF DESCRIPTION OF THE DRAWINGS

The following is a detailed description of an embodiment of the invention with reference to the drawings.

In the Figures.

DETAILED DESCRIPTION

Figure 4:
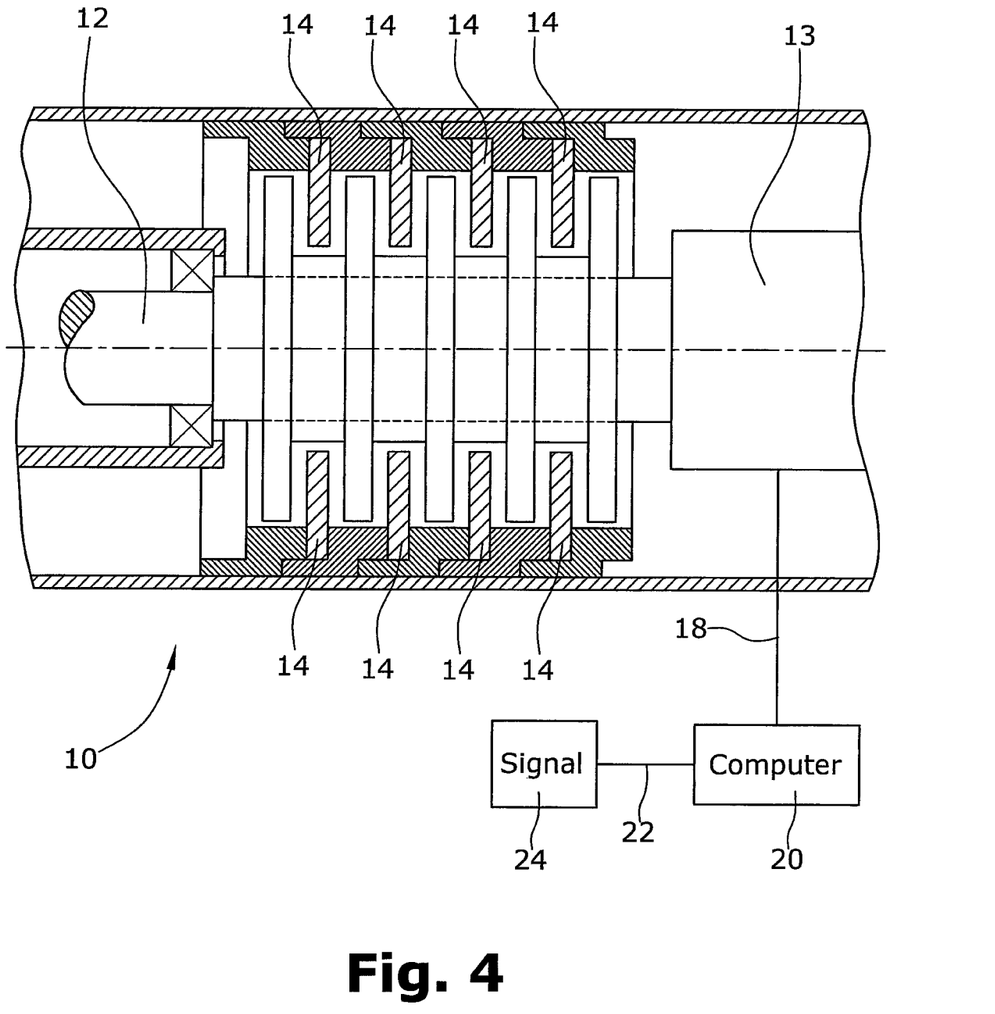
FIG. 4 is a diagrammatic illustration of a turbopump.

With reference to FIG. 4, in the operation of a gas turbopump 10 and in particular in the operation of a turbo molecular pump, the high rotational speeds and the great centrifugal forces entailed thereby cause high radial mechanical loads in the form of stresses, in particular in the area of the pump rotor 12. In view of the gaps between the pump stator 14 and the pump rotor 12 being as small as possible, rather minimal mechanical changes of the pump rotor can cause a collision between the pump rotor and the pump stator. A rotor speed sensing device 13 sends a rotor speed signal to a computer 20 via a line 18. The computer outputs a fatigue signal 24 in response to a total fatigue value exceeding a total fatigue limit value on a line 22.

Figure 5:
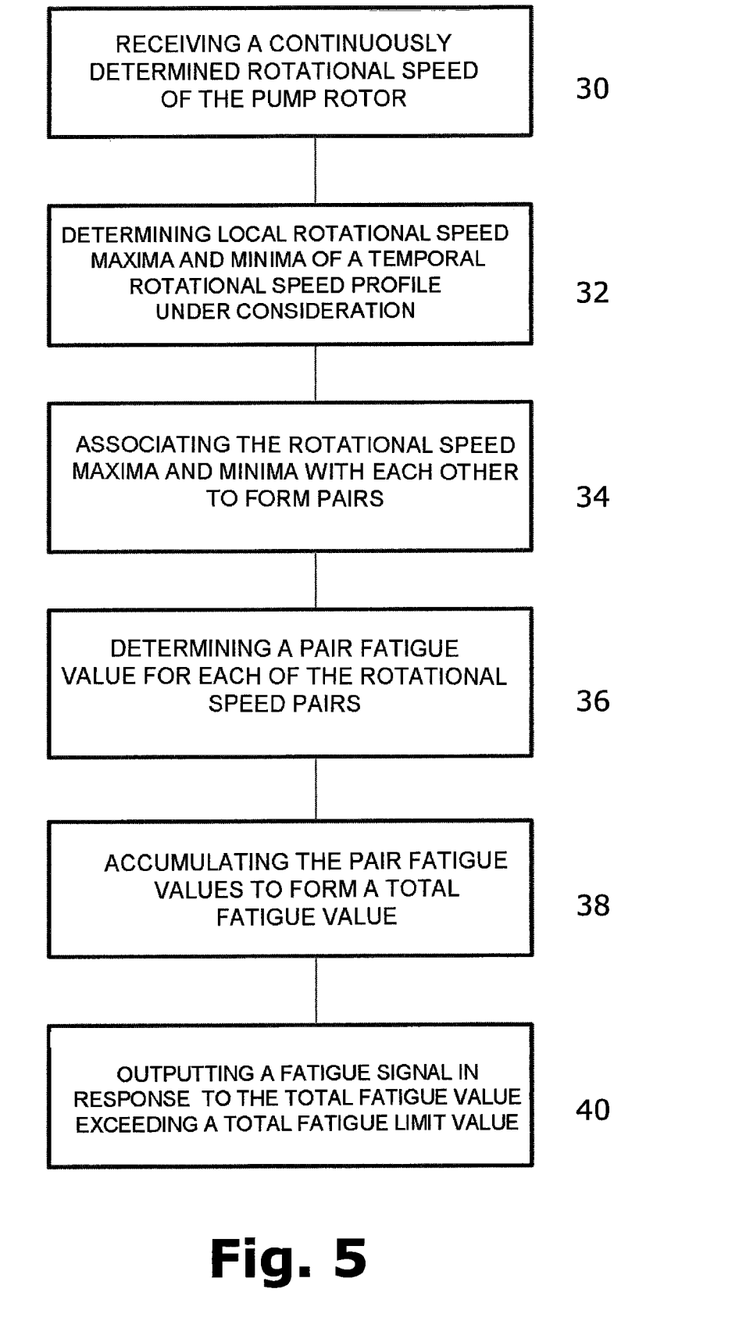
FIG. 5 is a flowchart illustrating the method steps.

As explained in greater detail below, the computer 20 is programmed for determining the fatigue of the pump rotor. With reference to FIG. 5, in a step 30, the computer receives the rotational speed of the pump rotor from the sensing device 13 which continuously determines the rotational speed of the pump rotor. In a step 32, local rotational speed maxima and minima of a temporal rotational speed profile under consideration are determined. In a step 34, the rotational speed maxima and minima are associated with each other to form pairs. In a step 36, a pair fatigue value is determined for each of the rotational speed pairs. In a step 38, the pair fatigue values are accumulated in a computer memory to form a total fatigue value. In a step 40, the fatigue signal 24 is output on line 22 in response to the total fatigue value exceeding a total fatigue limit value.

Besides the influence of the rotational speed itself and of the rotor temperature, explained in DE 101 51 682 A1 and describing the so-called creep stress, the so-called cyclic stress is also included in the mechanical fatigue of the pump rotor. Tests have shown that material fatigues due to creeping, on the one hand, and due to so-called cyclic stress, on the other hand, are largely independent from each other in a load range of stress and temperature usually found in practice. The temporal succession of creep stress and cyclic stress is of no great importance in considering the total fatigue of a component, so that both stresses can be added after they have been determined.

Figure 1:
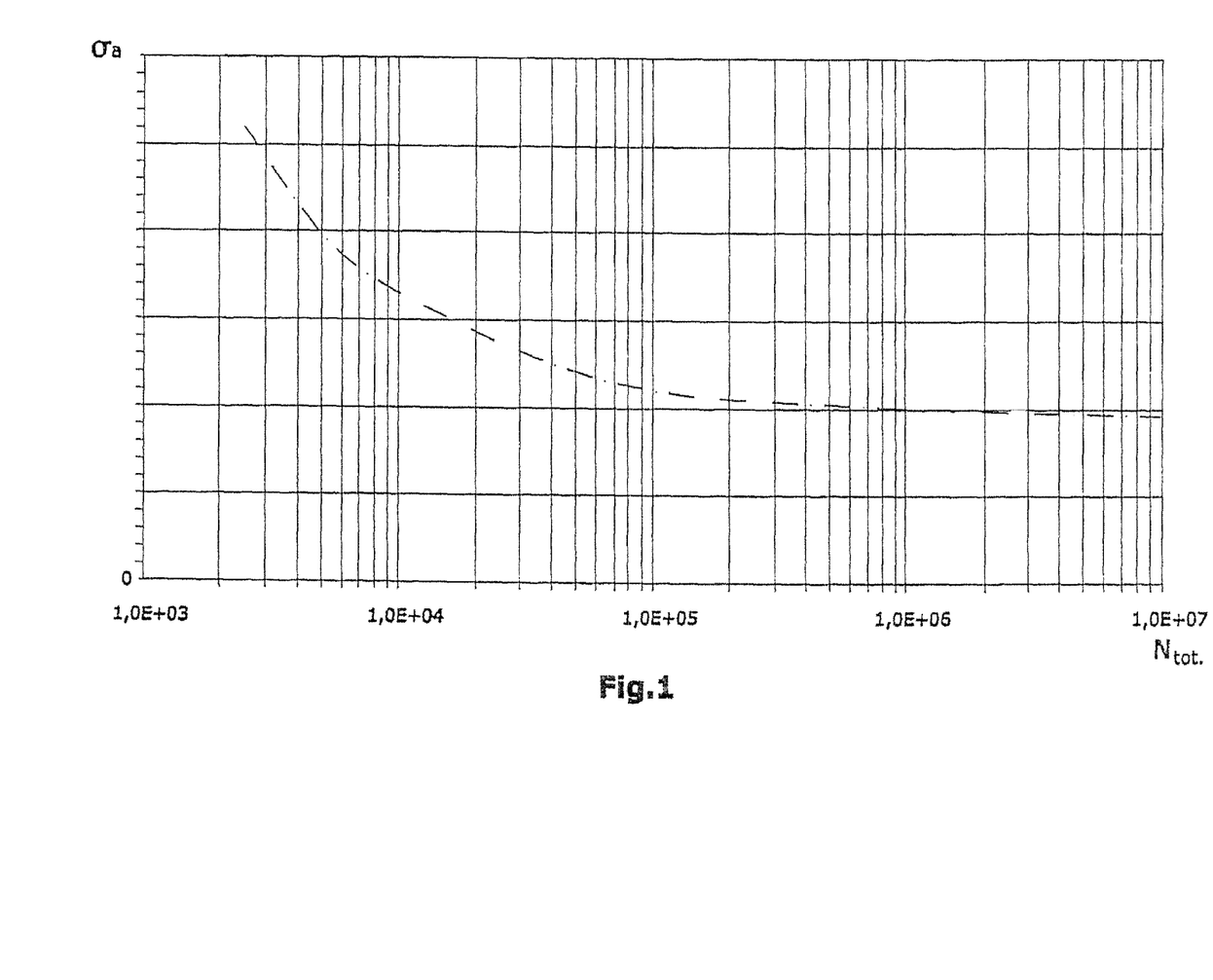
FIG. 1 shows a diagram illustrating the relationship between a stress amplitude $\sigma_a$ corresponding to a respective rotational speed and the number of cycles until destruction (Wöhler's diagram)

FIG. 1 illustrates the relationship between the stress amplitude $\sigma_a$, plotted on the ordinate, and the number of corresponding cycles of rotational speed until destruction, plotted on the abscissa. It clearly shows that there is a limit value for $\sigma_a$, below which the number of bearable cycles until rupture tends towards the infinite. The relationship between the rotational speed and the stress is defined by the material, the shape, the mass etc. of the pump rotor so that both values can alternatively used in calculation. Hereinafter, as an example, the mechanical stress is used in determining the fatigue.

Figure 2:
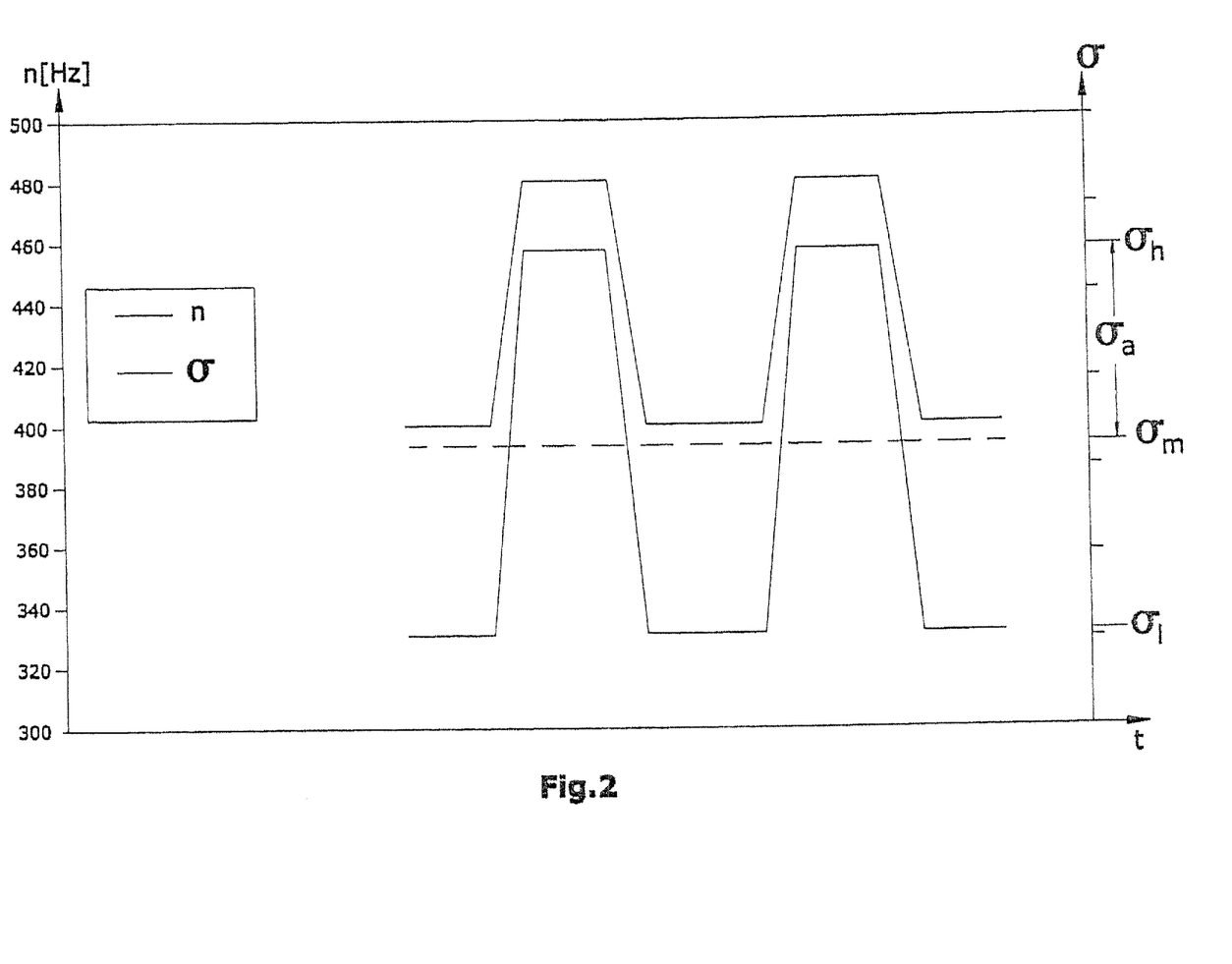
FIG. 2 shows a schematic illustration of the relationship between the rotational speed cycle and the stress cycle with the association of $\sigma_a$ and other specific stress parameters to the rotational speed.

For a better understanding of the following algorithms, FIG. 2 illustrates, in an exemplary manner, a cycle profile as a function of the rotational speed n of the pump and the corresponding stress $\sigma$ over time t.

For each cycle variant of a gas turbopump, a curve in accordance with FIG. 1 or an entire set of curves is experimentally determined for different loads. From these curves, the constant factors of a polynomial can be found, with which it may be determined, according to FIG. 2, for each cycle variant, how many uniform cycles would occur in total until destruction:

$$\log(N_{tot}) = \alpha_0 + \beta_1 \cdot \sigma_m + \beta_2 \cdot \sigma_m^2 + \beta_3 \cdot \sigma_m^3 + \gamma_1 \cdot \sigma_a + \gamma_2 \cdot \sigma_a^2 + \gamma_2 \cdot \sigma_a^3$$

where $N_{tot}$=number of uniform cycles (stress swings) until destruction $$\sigma_m = \frac{\sigma_h + \sigma_l}{2} = \text{mean stress}$$

$\sigma_a = \sigma_h - \sigma_m = \sigma_m - \sigma_l$ = stress swing/2 = range of stress $$\sigma_h = \sigma_{ref,zyklus} \cdot \left(\frac{\max(n_{z,1}; n_{z,2})}{n_{ref,zyklus}}\right)^2 = \text{upper stress;}$$

$n_{Z,1}$ and $n_{z,2}$ are the values or rotational speed associated with each other $$\sigma_l = \sigma_{ref,zyklus} \cdot \left(\frac{\min(n_{z,1}; n_{z,2})}{n_{ref,zyklus}}\right)^2 = \text{lower stress};$$

$\sigma_{ref}$ is the stress in the rotor at the rotational speed $n_{ref}$

The coefficients $\beta_1$-$\beta_3$ and $\gamma_1$-$\gamma_3$, as well as $\alpha_o$ are determined by interpolation, e.g. using the sum-of-squares method, from experimentally found value triples $N_{tot}$, $\sigma_m$, $\sigma_a$.

It is evident that the mean stress $\sigma_m$ and the stress swing $\sigma_a \cdot 2$ are included in the calculation via the mechanical stresses.

Figure 3:
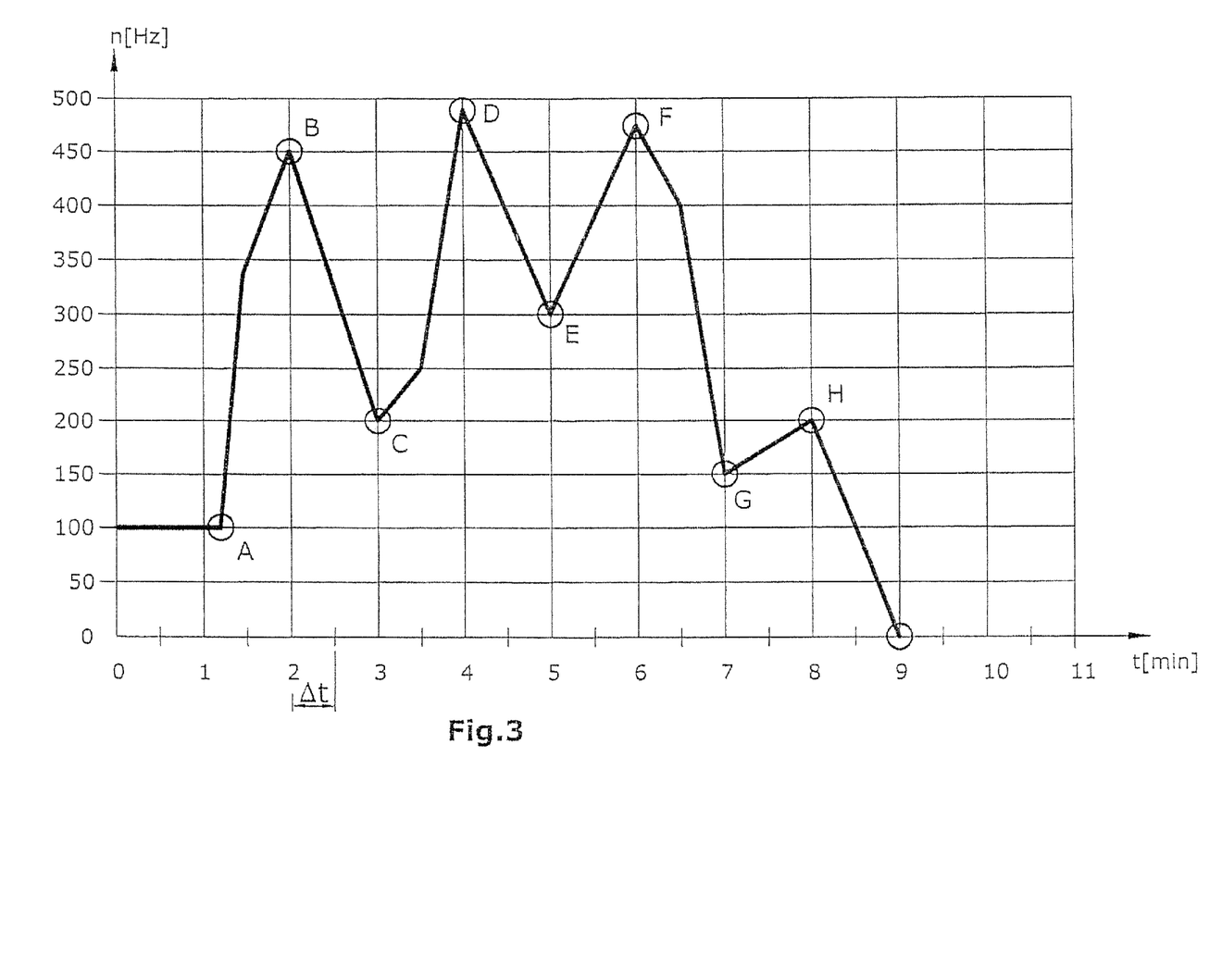
FIG. 3 illustrates a possible cyclic operation of a gas turbopump, for instance, illustrated as a rotational speed n over time t to define various parameters.

FIG. 3 is an exemplary illustration of a temporal rotational speed profile as found in practice. The rotational speed n of the rotor is determined at constant time intervals $\Delta t$. Of course, $\Delta t$ may be significantly shorter than illustrated in he present case, so as to realize a determination of the rotational speed at shorter intervals and to obtain a more precise picture of the temporal rotational speed profile. After a minimum rotational speed or a minimum rotational speed frequency of 10 Hz, for instance, has been undershot, a fatigue determination is performed.

As soon as the sign of the acceleration changes, the rotational speed maxi-mum or minimum just passed is stored as a local maximum or minimum. If the rotational speed stored is a local maximum, it is stored in a maximum memory of computer 20. If the rotational speed stored is a local minimum, it is stored in a minimum memory of computer 20. In the present example, minima are detected in this man-ner at the points B, D, F, H and minima are detected at the points A, C, E, G.

In order to detect the cyclic stress, no pairs of maxima/minima that are chronologically adjacent are formed, but pairs of extreme values occurring in the time span observed are formed. The first pair is made up from the lowest rotational speed minimum and the highest rotational speed maximum, i.e., in the present case, from the pair A-D. The second pair is formed from the remaining extreme values G, F, the third pair is formed from the values C and B etc. This procedure has established itself as a proven method.

Rotational speed values which represent a minimum in the chronological sequence and would have to be used as a maximum because of the formation of value pairs, thus are no real maximum and are ignored in the total evaluation. The same is true for pseudo minima. In the present case. This applies to the pair of E, H.

The time span under consideration for the determination of fatigue may be a full operation cycle, i.e. it may last from the last activation of the gas pump to the subsequent deactivation of the gas pump. However, the time span under consideration could also be the entire life cycle of the pump. In practice, the time span monitored will be limited by the available computer and memory capacity. When the entire past pump life cycle is considered, the whole accumulated wear value is recalculated completely each time.

With the formula solved for $N_{tot}$, a pair fatigue value L is calculated for each rotational speed maximum/minimum pair, using the formula:

$$L = 1/N_{tot}$$

The total fatigue value $L_{tot}$ results from the sum of the pair fatigue values L:

$$L_{tot} = \Sigma 1/N_{tot\,i} = \Sigma L_i$$

Further, the constantly accumulated creep fatigue value can be added thereto. The accumulated cycle fatigue value $L_{tot}$ or the combined creep/cycle fatigue value can be continuously compared with a total fatigue limit value $L_{max}$. The limit value $L_{max}$ is less than 1.0, since failure can be expected for a limit value $L_{max}=1.0$. As soon as the total fatigue value $L_{tot}$ exceeds the limit value $L_{max}$, a corresponding fatigue signal 24 is output.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

We claim:

1. A method for determining the fatigue of the pump rotor of a gas turbopump, comprising the following method steps:
   continuously determining a rotational speed of the pump rotor,
   determining local rotational speed maxima and minima of a temporal rotational speed profile under consideration,
   associating the rotational speed maxima and minima with each other to form pairs,
   determining a pair fatigue value for each of the rotational speed pairs,
   accumulating the pair fatigue values to form a total fatigue value, and
   outputting a fatigue signal in response to the total fatigue value exceeding a total fatigue limit value in order to determine a fatigue state.

2. The method for determining the fatigue of the pump rotor of a gas turbopump of claim 1, wherein the local rotational speed maxima and minima are zero crossings of the temporal profile of the rotor acceleration.

3. The method for determining the fatigue of the pump rotor of a gas turbopump of claim 1, wherein the step of determining the rotational speed of the rotor is performed at constant time intervals.

4. The method for determining the fatigue of the pump rotor of a gas turbopump of claim 1, wherein the pair fatigue value is determined by a polynomial that is at least square.

5. The method for determining the fatigue of the pump rotor of a gas turbopump of claim 1, wherein the step of determining the creep fatigue values includes:
   continuously determining the creep fatigue values from the rotational speed of the rotor and a rotor temperature and the step of accumulating the pair fatigue values includes continuously accumulating the pair fatigue values to form the total fatigue value.

6. The method for determining the fatigue of the pump rotor of a gas turbopump of claim 1, wherein the step of determining the pair fatigue value includes evaluating at least a cubic polynomial.

7. The method for determining the fatigue of the pump rotor of a gas turbopump of claim 1, further including:
   providing an alarm in response to the fatigue signal exceeding the total fatigue limit value.

8. The method for determining the fatigue of the pump rotor of a gas turbopump of claim 1, further including:
   storing the local rotational speed maxima and minima in one or more memories.

9. The method for determining the fatigue of the pump rotor of a gas turbopump of claim 1, wherein the steps of determining local rotational speed maxima and minima of a temporal rotational speed profile under consideration, associating the rotational speed maxima and minima with each other to form pairs, determining a pair fatigue value for each of the rotational speed pairs, accumulating the pair fatigue values to form a total fatigue value, and outputting a fatigue signal in response to the total fatigue value exceeding a total fatigue limit value are performed with a computer.

10. The method for determining the fatigue of the pump rotor of a gas turbopump of claim 1, wherein the steps of determining local rotational speed maxima and minima of the temporal rotational speed profile, associating the rotational speed maxima and minima with each other to form pairs, determining a pair fatigue value for each of the rotational speed pairs, accumulating the pair fatigue values to form a total fatigue value, and, outputting a fatigue signal in response to the total fatigue value exceeding a total fatigue limit value are performed with a computer.

11. The method for determining the fatigue of the pump rotor of a gas turbopump of claim 1, wherein determining the pair fatigue value includes determining at least one characteristic stress of the rotational speed pairs.

12. The method for determining the fatigue of the pump rotor of a gas turbopump of claim 11, wherein the characteristic stress is a mean stress of the respective rotational speed pair.

13. An apparatus for determining fatigue of a pump rotor of a turbopump comprising one or more processors programmed to:
  continuously receive a rotational speed of the pump rotor,
  determine local rotational speed maxima and minima of a temporal rotational speed profile under consideration,
  associate the rotational speed maxima and minima with each other to form pairs,
  determine a pair fatigue value for each of the rotational speed pairs, and
  accumulate the pair fatigue values to determine a fatigue state.

14. The apparatus for determining a fatigue of a pump rotor of a turbopump of claim 13, wherein the one or more processors are further programmed to:
  output a fatigue signal in response to the total fatigue value exceeding a total fatigue limit value.

15. A method for determining the fatigue of the pump rotor of a gas turbopump comprising the following method steps:
  with a speed sensor device, continuously determining a rotational speed of the gas turbopump rotor and outputting a temporal rotation speed profile;
  determining local rotational speed maxima and minima of the temporal rotational speed profile;
  associating the rotational speed maxima and minima with each other to form pairs;
  determining a pair fatigue value for each of the rotational speed pairs;
  accumulating the pair fatigue values to form a total fatigue value; and
  at an output, outputting a fatigue signal in response to the total fatigue value exceeding a total fatigue limit value in order to determine a fatigue state.

\* \* \* \* \*